(12) United States Patent
Rey et al.

(10) Patent No.: US 8,980,030 B2
(45) Date of Patent: Mar. 17, 2015

(54) METHOD AND APPARATUS FOR FORMING A MULTI-LAYERED TIRE COMPONENT

(75) Inventors: Daniel Robert Rey, Greer, SC (US); Larry Satterfield, Moore, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 108 days.

(21) Appl. No.: 12/989,335

(22) PCT Filed: Apr. 23, 2008

(86) PCT No.: PCT/US2008/061292
§ 371 (c)(1),
(2), (4) Date: Oct. 27, 2010

(87) PCT Pub. No.: WO2009/131578
PCT Pub. Date: Oct. 29, 2009

(65) Prior Publication Data
US 2011/0036485 A1    Feb. 17, 2011

(51) Int. Cl.
*B29D 30/08* (2006.01)
*B29D 30/46* (2006.01)
*B29B 17/00* (2006.01)
*B29D 30/30* (2006.01)
*B29D 30/24* (2006.01)
*B29K 21/00* (2006.01)

(52) U.S. Cl.
CPC ............ *B29D 30/46* (2013.01); *B29B 17/0005* (2013.01); *B29D 30/30* (2013.01); *B29D 2030/241* (2013.01); *B29K 2021/00* (2013.01)
USPC .......................... 156/123; 156/397; 156/406.4

(58) Field of Classification Search
USPC ........... 156/117, 128.1, 120, 133, 397, 406.4, 156/123, 128.6, 129, 130
See application file for complete search history.

(56) References Cited

U.S. PATENT DOCUMENTS 1,548,156 A * 8/1925 Mixsell .......................... 156/404
2,712,852 A * 7/1955 Carter ............................. 83/482
(Continued)

FOREIGN PATENT DOCUMENTS

CN          1713981 A      12/2005
DE          2740609 A1      3/1979
(Continued)

OTHER PUBLICATIONS

Machine-generated English language translation of JP 2007-283998 (original document dated Nov. 2007).*
(Continued)

*Primary Examiner* — Martin Rogers
(74) *Attorney, Agent, or Firm* — Hahn Loeser & Parks, LLP

(57) ABSTRACT

Methods and apparatus for forming a multi-layered tire component, the steps of the method including providing a mechanical system, the system including a plurality of cutting members; translating a sheet of material along a translation path through the mechanical system; cutting a first strip from the sheet with one or more of the plurality of cutting members, this step occurring during the step of translating; mechanically applying the first strip to a building surface, this step occurring during the step of translating; cutting a second strip from the sheet subsequent to the step of cutting the first strip, this step occurring during the step of translating; mechanically applying the second strip to a building surface, this step occurring during the step of translating.

9 Claims, 12 Drawing Sheets

(56) References Cited

U.S. PATENT DOCUMENTS

| | | | |
|---|---|---|---|
| 3,251,722 A | | 5/1966 | Holman |
| 3,485,128 A | * | 12/1969 | Siegenthaler .................. 83/326 |
| 3,580,781 A | * | 5/1971 | Hollis ........................... 156/397 |
| 3,595,724 A | | 7/1971 | LeBlond |
| 3,607,556 A | | 9/1971 | Appleby |
| 3,607,557 A | * | 9/1971 | Casey et al. .................. 156/366 |
| 3,779,834 A | | 12/1973 | Appleby et al. |
| 3,855,030 A | | 12/1974 | Schelkmann |
| 4,222,810 A | | 9/1980 | Ytterstrom |
| 4,266,112 A | * | 5/1981 | Niedermeyer ........... 219/121.72 |
| 4,276,104 A | | 6/1981 | Riggs |
| 4,358,978 A | * | 11/1982 | Lawson ........................ 83/364 |
| 4,448,627 A | | 5/1984 | Satoh et al. |
| 4,927,482 A | | 5/1990 | Capelle |
| 5,030,079 A | | 7/1991 | Benzing, II |
| 5,059,268 A | | 10/1991 | Satoh et al. |
| 5,108,527 A | | 4/1992 | Glover et al. |
| 5,178,714 A | | 1/1993 | Glover et al. |
| 5,252,156 A | | 10/1993 | Glinz |
| 5,820,726 A | | 10/1998 | Yoshida et al. |
| 6,336,488 B1 | | 1/2002 | Vannan et al. |
| 6,364,981 B1 | | 4/2002 | Smith et al. |
| 6,379,502 B1 | * | 4/2002 | Satzger et al. ................. 162/193 |
| 6,510,881 B1 | | 1/2003 | Takahashi et al. |
| 6,699,344 B2 | | 3/2004 | Sergel et al. |
| 6,923,879 B1 | | 8/2005 | Blickwedel et al. |
| 6,979,378 B2 | | 12/2005 | Okada et al. |
| 7,052,568 B2 | | 5/2006 | Tamura et al. |
| 7,175,726 B2 | | 2/2007 | Abe et al. |
| 7,195,047 B2 | | 3/2007 | Sieverding et al. |
| 7,264,193 B2 | * | 9/2007 | Hikita ........................ 242/527.2 |
| 2003/0051794 A1 | | 3/2003 | Suda et al. |
| 2003/0168152 A1 | | 9/2003 | Suda |
| 2005/0116374 A1 | | 6/2005 | Ogawa et al. |
| 2005/0183810 A1 | * | 8/2005 | Abe et al. ...................... 156/117 |
| 2006/0048874 A1 | | 3/2006 | Maruoka |
| 2009/0126874 A1 | | 5/2009 | Mehlan et al. |

FOREIGN PATENT DOCUMENTS

| | | |
|---|---|---|
| DE | 19823433 C1 | 6/1999 |
| DE | 102005046115 A1 | 3/2007 |
| EP | 0340147 A2 | 11/1989 |
| EP | 0419050 A2 | 3/1991 |
| EP | 0429286 A2 | 5/1991 |
| EP | 1293333 A2 | 3/2003 |
| EP | 1295707 A2 | 3/2003 |
| EP | 1410898 A1 | 4/2004 |
| EP | 1486320 A1 | 12/2004 |
| EP | 1498249 A1 | 1/2005 |
| EP | 1541326 A1 | 6/2005 |
| EP | 1612034 A1 | 1/2006 |
| EP | 1625932 A3 | 6/2006 |
| EP | 1977876 A1 | 10/2008 |
| GB | 1016279 A | 1/1966 |
| JP | 46-035970 Y1 | 12/1971 |
| JP | 49-081487 | 8/1974 |
| JP | 54000080 A | 1/1979 |
| JP | 61229538 | 10/1986 |
| JP | 1314151 A | 12/1989 |
| JP | 1314152 A | 12/1989 |
| JP | 07047617 | 2/1995 |
| JP | 08216290 | 8/1996 |
| JP | 929856 | 4/1997 |
| JP | 2000-108222 A | 4/2000 |
| JP | 2001179848 | 7/2001 |
| JP | 2001179849 A | 7/2001 |
| JP | 2002046194 | 2/2002 |
| JP | 2002-240164 A | 8/2002 |
| JP | 2002347135 | 12/2002 |
| JP | 2003080615 | 3/2003 |
| JP | 2003103652 A | 4/2003 |
| JP | 2003251709 | 9/2003 |
| JP | 2006-10856 A | 1/2006 |
| JP | 2006007661 | 1/2006 |
| JP | 2006110856 A | 4/2006 |
| JP | 2007098626 | 4/2007 |
| JP | 2007185886 A | 7/2007 |
| JP | 2007-283998 * | 11/2007 |
| JP | 2007-283998 A | 11/2007 |
| JP | 2008260296 A | 10/2008 |
| RU | 2 155 674 C2 | 9/2000 |
| RU | 2225792 C2 | 3/2004 |
| SU | 1369916 A1 | 1/1988 |
| SU | 1431960 A1 | 10/1988 |
| SU | 1705118 A1 | 1/1992 |
| WO | 02/055289 A1 | 7/2002 |
| WO | 02102579 A1 | 12/2002 |
| WO | 2006025258 | 3/2006 |
| WO | 2007010591 | 1/2007 |
| WO | 2008/012126 A1 | 1/2008 |

OTHER PUBLICATIONS

JP49-081487A—English abstract obtained from Nakamura & Partners on Jun. 29, 2012, 1 page.

DE2740609A1—English machine translation obtained from Espacenet (http://worldwide.espacenet.com) on Aug. 7, 2012, 5 pages.

JP2000-108222A—English machine translation obtained from Patent Abstracts of Japan (http://www19:ipdl.inpit.go.jp) on Jun. 22, 2012, 6 pages.

JP2002-240164A—English machine translation obtained from Google Translate (http://translate.google.com) on Aug. 7, 2012, 7 pages.

RU2225792C2—English abstract obtained from Espacenet (http://worldwide.espacenet.com) on Aug. 7, 2012, 2 pages.

EP1498249A1—English abstract obtained from Espacenet (http://worldwide.espacenet.com) on Aug. 7, 2012, 2 pages.

JP2006-10856A—English machine translation obtained from Google Translate (http://translate.google.com) on Aug. 7, 2012, 18 pages.

JP2007-283998A—English machine translation obtained from Google Translate (http://translate.google.com) on Aug. 8, 2012, 13 pages.

SU1369916A1—English abstract obtained from McElroy Translation on Aug. 20, 2012.

SU1431960A1—English abstract obtained from McElroy Translation on Aug. 20, 2012.

SU1705118A1—English abstract obtained from McElroy Translation on Aug. 20, 2012.

JP54000080A—English abstract obtained from Espacenet (http://worldwide.espacenet.conn) on Oct. 10, 2012, 1 page.

JP1314151A—English abstract obtained from Espacenet (http://worldwide.espacenet.com) on Oct. 10, 2012, 2 pages.

JP1314152A—English abstract obtained from Espacenet (http://worldwide.espacenet.com) on Oct. 10, 2012, 2 pages.

JP2001179849A—English abstract obtained from Espacenet (http://worldwide.espacenet.com) on Oct. 10, 2012, 2 pages.

JP2006110856A—English abstract obtained from Espacenet (http://worldwide.espacenet.com) on Oct. 10, 2012, 2 pages.

JP2007185886A—English abstract obtained from Espacenet (http://worldwide.espacenet.com) on Oct. 10, 2012, 2 pages.

JP2008260296A—English abstract obtained from Espacenet (http://worldwide.espacenet.com) on Oct. 10, 2012, 2 pages.

PCT/US2008/061292 International Search Report, Form PCT/ISA/210.

PCT/US2008/061292 International Written Opinion, Form PCT/ISA/237.

RU 2 155 674 C2—English abstract obtained from Espacenet (http://worldwide.espacenet.com) accessed on Feb. 22, 2012, 1 page.

* cited by examiner

METHOD AND APPARATUS FOR FORMING A MULTI-LAYERED TIRE COMPONENT

This application is a National Stage application of PCT Application No. PCT/US2008/061292, filed Apr. 23, 2008, to which this application claims priority and the benefit of, the disclosure of which is also hereby incorporated by reference.

BACKGROUND OF THE INVENTION

1. Field of the Invention

This invention relates generally to methods and apparatus for forming a layered tire component. More specifically, this invention relates to methods and apparatus for generating strips of material and using the same to form a band comprising a layered tire component.

2. Description of the Related Art

Various processes exist for forming bands comprising tire components, such as, for example, tire treads. Such processes include a winding process in which strips of material are wound about a drum to build a band having a desired cross-sectional profile. During the winding process, one or more strips may be assembled laterally and/or radially along a lateral width of the drum to form the desired profile. Application of each strip includes initially placing the strip manually upon the drum, winding the strip about the drum as desired, and subsequently cutting the strip from a supply source when a sufficient quantity of strip has been applied. A subsequent strip may be applied, which generally requires manual attachment thereof to the drum. Application of a second strip may also require a substitution of material sources. The overall process provides a discontinuous, inefficient process, wherein interruptions arise when building a tire component band with subsequent strips. Therefore, it may be desired to provide a continuous process, where subsequent strips may be formed and applied automatically, without unnecessary interruption or delay.

With regard to strip formation, in certain instances, the strips are cut from a sheet or similar form of material. Upon removal of the strips from the sheet, the remaining sheet portion is generally directed from the machine. Not only does this potentially amount to waste of material, but it also provides inefficiencies. For example, when a material source is exhausted, which may comprise a roll or input material for an extruder, the exhausted source must be replaced or replenished with a new source. Therefore, it may be desired to provide a process in which unused or discarded material is automatically reused by the process as input material for the material supply source, which produces sheets for subsequent strip formation.

SUMMARY OF THE INVENTION

Particular embodiments of the present invention include methods and apparatus for generating a multi-layered tire component. Particular embodiments of the present invention include methods of forming a multi-layered tire component, the methods having steps that include providing a mechanical system, the system including a plurality of cutting members. Other steps include translating a sheet of material along a translation path through the mechanical system. Other steps include cutting a first strip from the sheet with one or more of the plurality of cutting members, this step occurring during the step of translating, and mechanically applying the first strip to a building surface, this step occurring during the step of translating. Other steps include cutting a second strip from the sheet subsequent to the step of cutting the first strip, this step occurring during the step of translating, and mechanically applying the second strip to a building surface, this step occurring during the step of translating.

Particular embodiments of the present invention include methods of forming a multi-layered tire component, the method having steps that include introducing input material into a sheet generator and forming a sheet of material with the sheet generator. Other steps include mechanically translating the sheet about a closed-loop path, the path extending from the sheet generator and returning to the sheet generator for use as input material and mechanically forming one or more strips from the sheet.

Particular embodiments of the present invention include methods of forming a strip of material for forming a tire component, the method having steps that include providing a mechanical system, the system including a plurality of cutting members and translating a sheet of material along a translation path through the mechanical system. Other steps include cutting a strip from the sheet with a pair of cutting members, this step occurring during the step of translating, the step of cutting including the following steps: positioning a pair of cutting members relative to the sheet, wherein each of the cutting members are arranged in a spaced relation to the other along a length of the sheet; engaging one of the cutting members with the sheet to form a first cutting path; and, engaging the other cutting member with the sheet to form a second cutting path, wherein the first and second paths intersect in a first instance at a first end of the strip and intersect in a second instance at a second end of the strip, the first and second cutting paths extending between the first and second strip ends in a spaced apart relationship.

Particular embodiments of the present invention include a method of forming a strip from a sheet of material, the method having steps that include translating a sheet of material along a translation path through the mechanical system. Other steps include cutting a first strip from the sheet with one or more of a plurality of cutting members, this step occurring during the step of translating and further comprising: positioning a pair of cutting members relative to the sheet, wherein each of the cutting members are arranged in a spaced relation to the other along a length of the sheet; engaging one of the cutting members with the sheet to form a first cutting path; and, engaging the other cutting member with the sheet to form a second cutting path, wherein the first and second paths intersect in a first instance at a first end of the strip and intersect in a second instance at a second end of the strip, the first and second cutting path extending between the first and second strip ends in a spaced apart relationship.

Particular embodiments of the present invention include a mechanical system for forming a multi-layered tire component upon a building surface that includes a sheet generator, the generator forming a sheet from input material. The system also includes a cutting assembly, the cutting assembly including a plurality of cutting members for cutting one or more strips from the sheet. The system further includes an applicator assembly for applying strips upon a building surface to form a multi-layered tire component and a sheet recovery assembly, the recovery assembly translating the sheet from the cutting assembly to the generator for reuse as input material by the generator.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
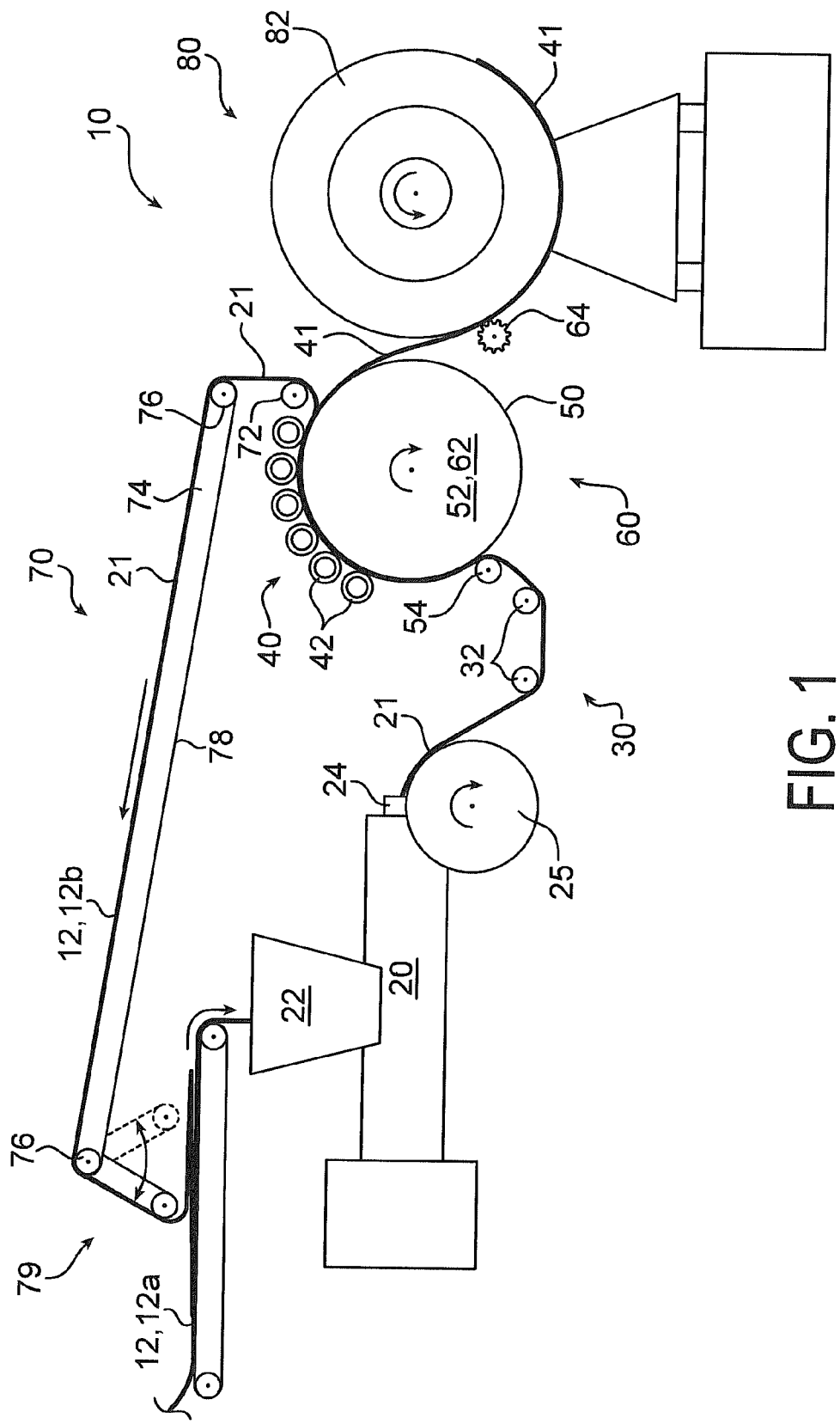
FIG. 1 is a side view of a multi-layered tire component-forming system, according to an embodiment of the invention.

Particular embodiments of the present invention provide methods and apparatus for forming a multi-layered tire component for use on a tire carcass.

Particular embodiments of the present invention include methods of forming a multi-layered tire component. A multi-layered tire component may comprise, for example, a tread, sub-tread, or cushion gum, and may be formed by winding one or more strips about a building surface to form a multi-layered band (i.e., a ring). The strips may be placed laterally across a width of the band (i.e., the tire component), and may be stacked or layered radially to form a plurality of layers. The band may be profiled by winding one or more strips at particular locations along a width of the band, where each strip has a width that is less than the width of the band. Particular embodiments of such methods may include the step of introducing input material into a sheet generator. Other steps may include forming a sheet from input material with the sheet generator. Input material, such as, for example, elastomeric material, is introduced into a sheet generator to form a sheet of the input material. The generator processes the input material to form a sheet having a width and a thickness. Input material may include new material as well as previously formed sheet that has been recovered and returned to the generator. The sheet generator may comprise any known means of forming a sheet of material, such as, for example, an extruder or a calendar. An extruder generally accepts input material and subsequently heats and pushes the same through a die to form a sheet, the die having a desired size and shape associated with a cross-section of sheet. Sheet may also be formed to a desired size and shape by translating through one or more calendars. A generator may also include both an extruder and a calendar to cooperatively generate a sheet.

The methods may further include the step of mechanically translating the sheet about a closed-loop path, the path extending from the sheet generator and returning to the sheet generator for use as input material. In other embodiments, the methods include the step of translating a sheet of material along a translation path through a mechanical system. Once the sheet is formed by the generator, the sheet is translated in a lengthwise direction along a continuous path through a cutting assembly, where one or more strips may be formed and extracted from the sheet. Subsequent to translating through the cutting assembly, the sheet, which may or may not have been cut by the cutting assembly, returns to the generator for reuse as input material for continuous formation of the sheet. Accordingly, the return of the sheet to the generator completes the continuous, closed-loop path. By providing a closed-loop path, unused sheet is reused to continuously form the sheet or a new sheet. Further, the closed-loop path provides an automatic strip forming system, in which various strips may be continuously and subsequently formed. Still further, the continuous, closed-loop path allows the sheet to start, stop, and restart as desired during the process of forming the tire component.

The methods may further include the step of providing a mechanical system, the system including a plurality of cutting members. The methods may also include the step of cutting one or more strips of material from the sheet. In other embodiments, methods may include the steps of cutting a first strip from the sheet with one or more of the plurality of cutting members, this step occurring during the step of translating, and cutting a second strip from the sheet subsequent to the step of cutting the first strip, this step occurring during the step of translating. Subsequent to forming the sheet, the sheet translates as described above and is cut to form one or more strips, each of which may be used to assemble and form a multi-layered tire component. Cutting of the sheet occurs after sheet generation and prior to the sheet being redirected back to the generator to regenerate the continuous sheet. The strips may be formed by a plurality of cutting members, each of which may comprise, for example, rotary knives (i.e., disks or the like that rotate along a surface that is being cut) and/or stationary knives (i.e., any non-rotating knife). The plurality of cutting members may form a portion of a mechanical assembly, as suggested above. Each of the cutting members may operate to cut a path within sheet.

In one embodiment, a step of cutting may include the steps of cutting one or more laterally extending cutting paths into the sheet of material with one or more of the plurality of cutting members to form a leading edge of the strip, cutting a one or more side cutting paths extending from the leading edge to form a width of the strip, and cutting one or more laterally extending cutting paths from the side paths to form a trailing edge of the strip. Cutting members may cut a path within the continuous sheet, where the path forms a perimeter about a strip, to allow the extraction and removal of the strip from the sheet. By cutting a beginning and an end of a strip, and a portion between the beginning and end, the sheet is able to remain continuous and translate about a closed-loop path. Cutting may be performed on a cutting drum, upon which the sheet translates. In other embodiments, a step of cutting may include the steps of positioning a pair of cutting members relative to the sheet, wherein each of the cutting members are arranged in a spaced relation to the other along a length of the sheet, engaging one of the cutting members with the sheet to form a first cutting path, and engaging the other cutting member with the sheet to form a second cutting path, wherein the first and second paths intersect in a first instance at a first end of the strip and intersect in a second instance at a second end of the strip, the first and second cutting paths extending between the first and second strip ends in a spaced apart relationship. A pair of cutting members may operate cooperatively to form a strip from within a sheet, which may occur along an intermediate portion between the sides of the sheet. To achieve this, the cutting paths formed by each cutting member intersect at different instances to form a leading and trailing edge (i.e., a beginning and end of a strip).

In particular embodiments, a step of cutting may include translating at least one of the cutting members in any direction angled from a translation direction of the sheet. In particular embodiments, the step of cutting may include providing a cutting edge of at least one of the one or more cutting members that is angled relative a translation direction of the sheet during the step of cutting. When a cutting member cuts a path along a sheet, the sheet is moving in a translation direction. Therefore, a longitudinal or lengthwise cut may be made by simply pressing and maintaining a cutting member against the moving sheet. In other words, a cut may be made in the direction of travel of the sheet may by maintaining a cutting member in a stationary position with a cutting edge thereof engaging the moving sheet. However, if a lateral cut is desired, that is, a cut at any angle from the translation direction of the sheet, cutting member translates in desired any lateral direction (that is, at any angled direction other than 0 and 180 degrees from the translation direction of the sheet). Further, a cutting member may rotate to angle its cutting edge relative to the sheet's direction of travel to better achieve the angled cut along the sheet. Cutting members are also capable of cutting strips having different and/or varying widths. The plurality of cutting members may also be capable of cutting multiple strips concurrently from the sheet at different locations along the sheet width.

Ultimately, strips are removed from the sheet. To facilitate separation of any strip(s) from the sheet, it is understood that a minimal amount of material remains in the sheet to resist any forces arising during the extracting of strips from the sheet. Otherwise, the sheet may rip or tear during strip extraction, and compromise the continuous nature of the sheet. In one embodiment, material remains along each of the lateral sides of the sheet after strip formation, or, in other words, strips are formed between the sides of the sheet so to leave a desired amount of material along each side of the sheet. Still, one or more sides of the sheet may be cut from the sheet to form a portion of a strip, and one or more intermediate portions of sheet may remain with or without one or more sides of sheet.

The methods may further include the step of mechanically applying the one or more strips to a building surface during the step of forming. In other embodiments, the methods may include the steps of mechanically applying the first strip to a building surface, this step occurring during the step of translating and mechanically applying the second strip to a building surface, this step occurring during the step of translating. After a strip is initially cut, the beginning or leading edge of the strip is translated towards a building surface, to which the strip will be automatically transferred and wound to form a layered tire component (i.e., a band). In one embodiment, the building surface is associated with a building drum, which may include an exterior surface of the building drum as well as a surface of any tire carcass (which may comprise, for example, a tire belt), strip, or tire component (i.e., band) located on the building drum. In particular embodiments, it may be desired to facilitate adhesion between each strip and the applicator drum, so to retain each strip upon applicator drum while the remaining sheet is removed from applicator drum for return to the generator. Accordingly, applicator drum may be temperature controlled (i.e., capable of being heated and/or cooled), and the surface thereof may be a smooth or textured surface to promote the desired adhesion. Once the strip is separated from the sheet, the strip is directed towards the building surface. In particular embodiments, mechanically applying a strip includes placing each strip into pressurized contact against the building surface by translating at least one of the building surface and an applicator drum toward the other. To achieve the pressurized contact, in particular embodiments, the applicator drum translates towards the building surface. However, the applicator drum may temporarily place the strip into pressurized contact, and therefore, in particular embodiments, the applicator drum retracts to a resting position after placing each of the strips into pressurized contact against the building surface. Each of the steps of cutting and applying may be achieved mechanically, and may be repeated to subsequently apply one or more strips to the tire component.

When a continuous sheet operates along a closed-loop path, it is possible to vary the formation and translation rate of the sheet. By reducing or stopping the translation of sheet when not forming or applying any strips, the amount of sheet material that is recovered and reprocessed is reduced, which may extend the life of the sheet material. Accordingly, the methods may also include the steps of translating the sheet at a first speed during the step of mechanical applying the one or more strips and translating the sheet at a second speed when performing steps other than the steps of applying and forming one or more strips, the second speed being less than the first speed. In one embodiment, the first speed may be at least 80 meters per minute. In particular embodiments, the second speed is 2 meters per minute or less. Particular embodiments include the second speed being 0 meters per minute. The duration of the temporary pause in sheet generation and translation may be limited in time based upon the particular composition and type of generator being used. For example, if an extruder is being used to form the sheet, a particular period of standby or inactivity may be allowed before the input material contained within the extruder reaches a critical temperature, upon which the composition and its properties begin to deteriorate or change. Therefore, before reaching any critical temperature, either the material should be extruded or the extruder temperature reduced to avoid any degradation in the input material properties. Further, the first speed may be selected to form a tire component (i.e., a band) within a desired period of time, such as, for example, during a tire building process, where one or more process are being performed at one or more stations during the same period of time.

It may also arise that when a tire component is complete, there may be a delay while the completed component is removed and another building drum or the like is returned for building a subsequent tire component. Accordingly, the methods may also include the steps of terminating the step of forming one or more strips after the tire component has been formed, while the sheet continues to translate about the closed-loop path in the step of translating and re-performing the step of forming one or more strips for forming a subsequent tire component. Likewise, the methods may include the steps of terminating the steps of forming one or more strips and translating the sheet about a closed-loop path after the tire component has been formed and re-performing the steps of translating a sheet about a closed-loop path and forming one or more strips, for forming a subsequent tire component.

The methods may further include the step of mechanically redirecting the sheet for reuse as input material. Steps may also include returning the sheet to the generator as input material. As mentioned above, once strips are cut and removed from the sheet, the remaining sheet may be redirected for reuse as input material in the formation of subsequent sheet by the generator. By returning to be reformed (i.e., reprocessed) into a subsequent, uncut, or full-width sheet, the closed-loop path is completed. During its return, but before reintroduction and reformation, the recovered sheet may be processed. The processing may include resizing and/or reshaping the recovered sheet, which may include heating or cooling the recovered sheet prior to reintroduction. In one embodiment, the recovered sheet is cooled prior to being introduced into an extruder generator, so the recovered sheet does not adhere to the inside of the extruder. Processing may also control the rate at which the recovered sheet is reintroduced for sheet reformation. This may be desired, as varying amounts of sheet may be recovered, as the formation and application process may be performed at varying rates and may include the extracting of varying quantities and sizes of strip from the sheet.

The methods described herein are used to form a band forming a multi-layered tire component. Exemplary embodiments of a multi-layered tire component-forming machine for use in practicing such methods is discussed in further detail below.

A system 10 for generating a multi-layered tire component 14 in accordance with the methods described herein is generally shown in FIG. 1. System 10 generally operates to form a multi-layered tire component 14 by winding strips 41 about a building surface. Because tire component 14 is a wound product, it generally forms a band (i.e., a ring). Component 14 is also referred to herein as a band. Also, system 10 generates a sheet 21 from which the strips 41 are formed, and, in particular embodiments, the sheet 21 remains continuous as it travels along a closed-loop path to and from a sheet generator 20. Accordingly, system 10 automatically returns any unused sheet material for reuse by generator 20. System 10 generally forms elastomeric tire components 14, such as, for example, tread, sub-tread, and cushion gum. In the embodiment shown in FIG. 2, multi-layered band 14 comprises a profiled tire tread band.

Figure 2:
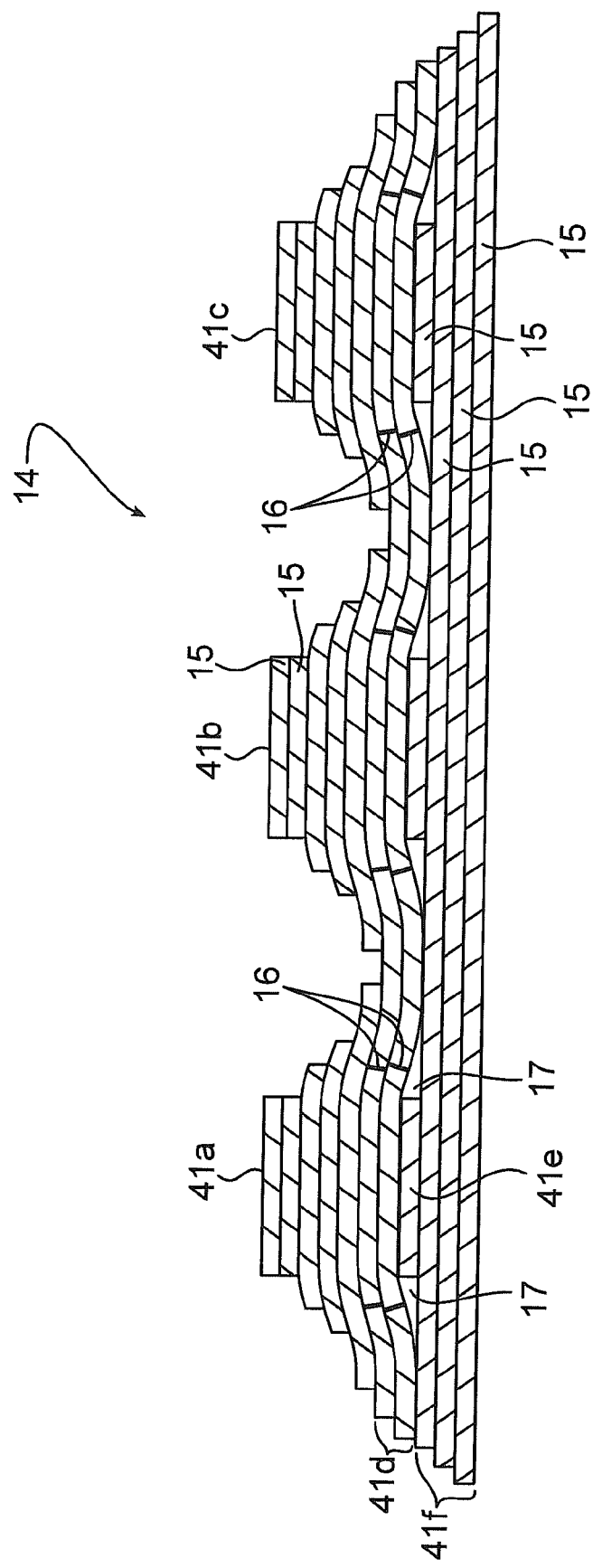
FIG. 2 is a cross-sectional view of a multi-layered band formed in accordance with an embodiment of the invention.
Figure 3:
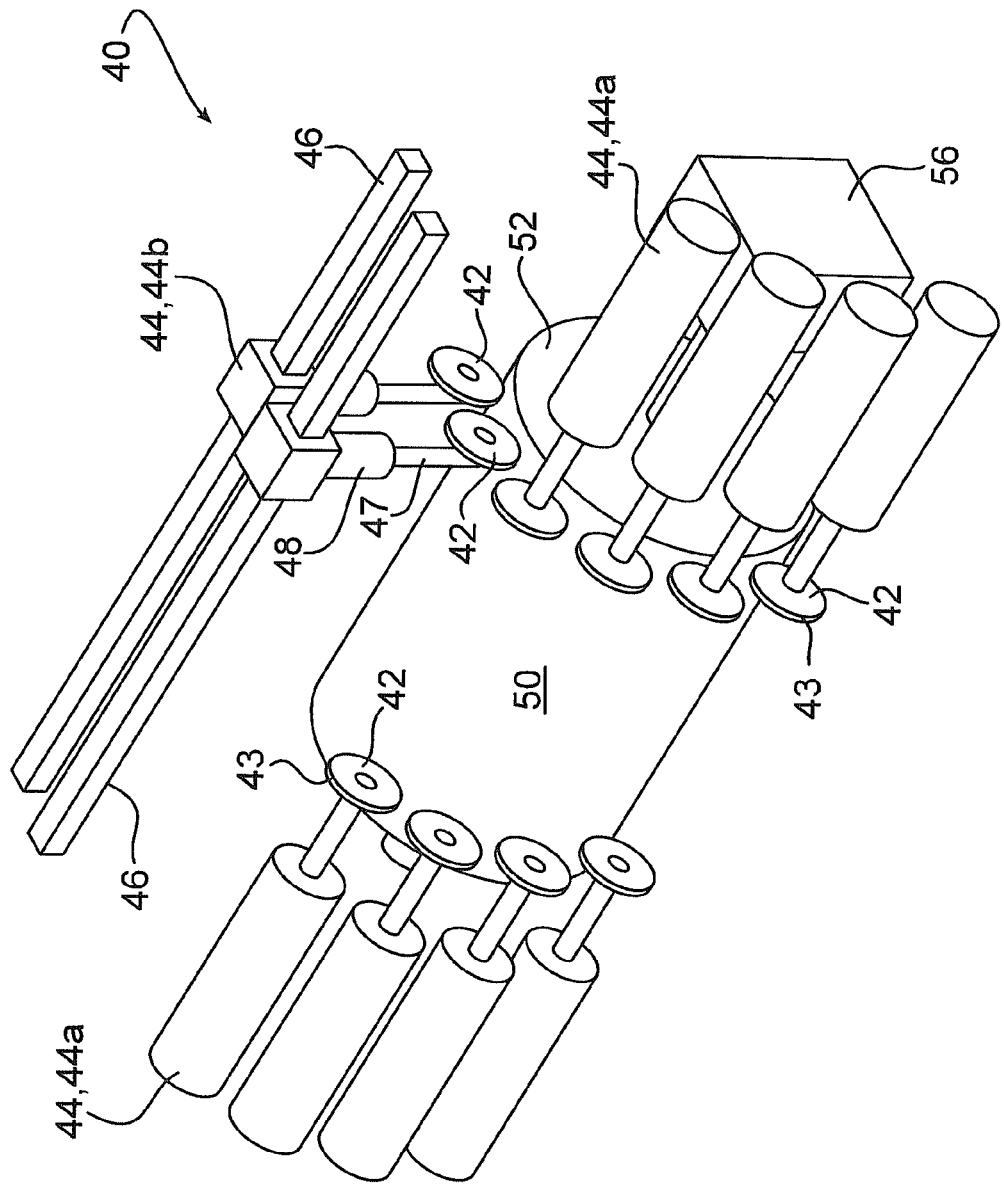
FIG. 3 is a perspective view of a cutting assembly of the system shown in FIG. 1, according to an embodiment of the invention.

Band 14 shown comprises a plurality of layers 15, which may be formed from one or more strips 41 wound about a building surface, which, in one embodiment, comprises a surface associated with a building drum 82. Each band 14, and therefore, the one or more strips 41, may be formed of one or more elastomeric materials or compounds. In one example, as shown in FIG. 2, strips 41a, 41b, 41c, and 41d are formed of a first material, while strips 41e and 41f are formed of a second material. Each band 14 may also comprise different layered and/or profiled arrangements. In the embodiment shown in FIG. 2, strips 41a, 41b, and 41c are wound about a building surface to form profiled portions of band 14. Slits 16 may be formed in a strip 41, or a portion thereof, to provide a means of releasing air that may become trapped between layers 15, as shown in FIG. 2 when strip 41d is laid over strip 41e, which then forms a pocket of trapped air 17 between strips 41f and 41d. Slits 16 may be formed by a cutting member 42 of cutting assembly 40, in one embodiment, or by any other cutting means known to one of ordinary skill in the art. Slits 16 may be cut at a particular lateral location, and the location may be maintained (i.e., remain constant) for a length of the slit 16. The lateral location may also vary (i.e., translate laterally) over a length of the slit 16, which, in a particular embodiment, may form a spiral-like slit 16 when the strip 41 is wound to form a band 14.

In an embodiment, system 10 comprises a sheet generator 20, a cutting assembly 40, a strip applicator assembly 60, a recovery assembly 70, and a programmable logic controller 90. System 10 may also include a roller assembly 30 for directing a sheet 21 from generator 20 to cutting assembly 40.

Sheet generator 20 generally transforms input material 12 into a sheet 21, which is ultimately cut into strips 41 by cutting assembly 40. With continued reference to FIG. 1, input material 12 is received through inlet 22, and may comprise new material 12a and/or previously used material 12b supplied by recovery assembly 70. After receiving input material 12, generator 20 forms the input material by any known means into sheet 21, where sheet 21 is formed to any desired width and thickness. Sheet 21 is expelled from generator 20 by way of outlet 24. In one embodiment, as shown in FIG. 1, generator 20 comprises an extruder. Extruders generally push input material 12 through a die or head, such as by way of a screw. Any extruder known to one of ordinary skill in the art may be used by system 10. Generator 20 may also comprise a calendar, in lieu of an extruder, which may comprise a pair of rollers positioned in close proximity to each other to form a gap or nip, through which input material 12 passes to from a sheet 21. The resulting sheet 21 includes a width associated with the width of the calendar nip. While an extruder and calendar are capable of operating at similarly high speeds, a calendar may not accelerate as quickly to attain a desired speed, as it may take more effort and time to accelerate the rotational inertia of the calendar rolls. This may affect the start-up time of system 10, as well as the responsiveness of system 10 to restart after a temporary delay. An extruder, however, typically applies significantly more heat to the input material than a calendar during processing, which negatively affects scorch and other properties and, therefore, reduces the reprocessing life of the material used in system 10. An extruder may also perform more work upon the input material, at least reduces the fluidity of the material during its lifetime, which again reduces the life of such material.

Figure 10:
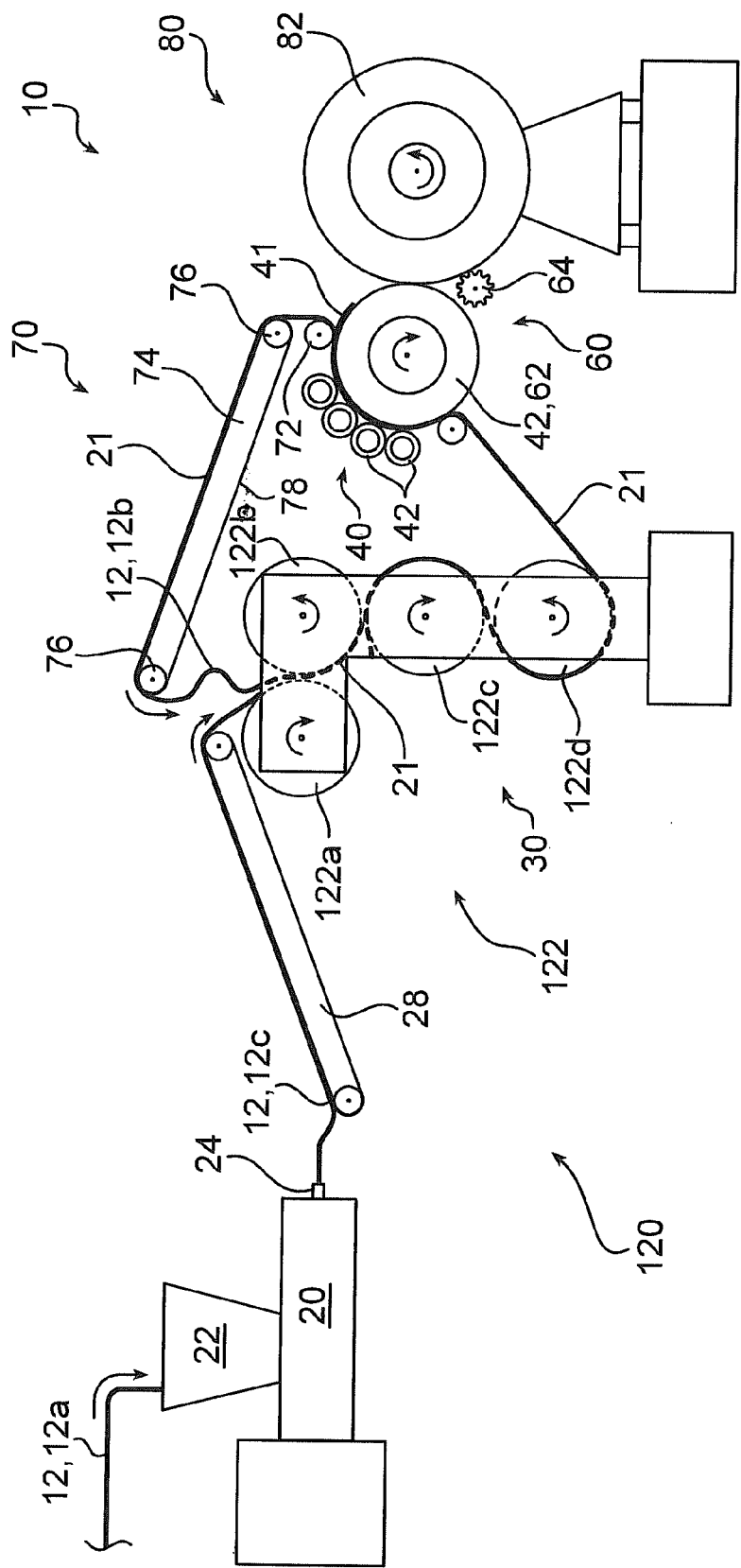
FIG. 10 is a side view of an alternative multi-layered tire component-forming system, according to an embodiment of the invention.

In another embodiment, as shown in FIG. 10, a generator 120 is provided, which comprises a calendar system 122. As mentioned above, a calendar may be desired as it generally does not deteriorate the input material 12 as quickly as an extruder. In the embodiment shown, an extruder 124 operates to intermittently produce input material 12c, for the limited purpose of providing input material 12c to calendar system 122 as is necessary to supplement input material 12b for forming sheet 21. Material 12c is transported along transfer assembly 28 to calendar system 122, where material 12c becomes input material for calendar system 122. Transfer assembly 28 may comprise a conveyor or any other known means of translating material 12, such as may be discussed below in conjunction with transfer assembly 74. Extruder 124 may be replaced by a calendar, or, in another embodiment, neither may exist and instead input material 12*a* is directly deposited into calendar system 122.

Generator 120, or calendar system 122, at least includes a pair of calendar rolls 122*a*, 122*b*, through which input material 12*b*, 12*c* passes to form sheet 21. Calendar rolls 122*a*, 122*b* are closely positioned to form a gap there between, which is referred to as a nip (also discussed above). The size of the nip forms a thickness of sheet 21. Therefore, the nip, or the distance between rolls 122*a*, 122*b*, may be varied to adjust a thickness of sheet 21. After sheet 21 is exits rolls 122*a*, 122*b*, sheet 21 may pass through one or more additional pairs of calendar rolls, such as, for example, pairs 122*b*, 122*c* and 122*c*, 122*d*, as shown in FIG. 10. As sheet 21 passes through these additional pairs of rolls, the dimensions (thickness and width) of sheet 21 may be further manipulated to achieve a desired sheet 21. If additional manipulation is not desired, the nip of each subsequent pair of rolls, if existing, may be widened to avoid any additional processing. Regardless, the calendar system 122 forms a path that directs sheet 21 to cutting assembly 40 and may also operate as a tensioning system, in addition to, or in place of, roller assembly 30, which is discussed in greater detail below.

The cross-sectional dimensions (i.e., width and thickness) of sheet 21 are generally controlled by generator 20 and/or calendar system 122. An extruder may utilize a die to control the cross-sectional dimensions of a sheet 21. A calendar, such as 122*a*, 122*b*, may control the thickness by adjusting the nip (as discussed above) and the width by adjusting internal side constraints. The cross-sectional dimensions of sheet 21 may also be adjusted and/or controlled by regulating the translation speed and/or tension of sheet as it travels through system 10. For example, one or more drums or rolls may be used to control the speed and/or tension of sheet 21, which include, for example, a generator output drum 25, calendar rolls 122*a*, 122*b*, 122*c*, 122*d*, one or more tensioning rolls 32, a cutting drum 52, and/or an applicator drum 62. Sheet 21 may comprise any thickness, and, in one embodiment, the thickness of sheet 21 is between 0.5 and 1.5 millimeters (mm).

If the thickness of sheet 21 is too small, sheet 21 may tear while navigating the translation path of system 10, during the cutting or application processes, or when system 10 is resuming formation of sheet 21 by generator 20. Therefore, a minimum thickness may be desired, where such thickness may vary depending upon the sheet material and the conditions to which sheet 21 is exposed. Further, sheet 21 may include certain areas of increased thickness, where the increase in thickness is designed to resist any tearing of sheet 21 within system 10. In one embodiment, the lateral sides of sheet 21 may comprise a thickness greater than the intermediate portions of sheet 21. Also, generator 20 may provide an intermittent increase in the cross-sectional thickness of sheet 21 adjacent generator 20 to prevent any tearing of sheet 21 when system 10 resumes sheet generation.

In various embodiments generator 20 is capable of producing sheet 21 at various speeds, ranging from zero (0) meters per minute (m/min), to 80 m/min and above. This allows system 10 to rapidly produce sheet 21 during band formation, and to slow or temporarily halt sheet generation when desired. It is commonly known that over-processing and reheating of elastomeric material negatively affects fluidity, scorch, and other material properties. Therefore, when strips 41 are not being produced, or when there is otherwise a delay in the band forming process, sheet formation and translation through system 10, may be temporarily placed in an idle mode or temporarily stopped. This may reduce any unnecessary re-processing of input material to extend the life thereof. When in idle mode, sheet 21 may translate, and generator 20 may operate, at an idle speed. The idle speed may be any desired speed, which may be, for example, 2 m/min. When it is desired to form band 14, system 10 may operate in a production mode, where strips 41 are formed and applied at any desired speed. When in production mode, in one embodiment, at least generator 20, cutting assembly 40, and applicator assembly 60 operate at a production speed of 80 m/min. The production speed may vary, and may increase from an initial speed. For example, when in production mode, the production speed may be achieved by escalating from the idle speed. Production mode may also initialize from a ready mode, the ready mode having a ready mode speed that is greater than the idle speed and less than the production speed. In one embodiment, the ready mode speed is 20 m/min. When switching between modes, the speed may slowly or methodically ramp up or down in an effort to prevent any tearing of sheet 21, which may result from abrupt changes in speed. As discussed above, particular portions of sheet 21 may include thickened portions to resist any tearing of sheet 21 on restart or the increase in operation speed.

As shown in FIG. 1, a roller assembly 30 may be located between sheet generator 20 and cutting assembly 40. Roller assembly 30 generally comprises one or more rolls 32 arranged to form a translation path of sheet 21. The particular translation path directs sheet 21 to cutting assembly 40, and may be used to tense sheet 21 as desired. The location of rolls 32 may be adjusted to impart more or less tension on sheet 21, which may also provide a means for adjusting the cross-sectional dimensions of sheet 21. One or more rolls 32 may be driven or powered, such as, for example, by a motor, to assist in the translation of sheet 21, and/or adjustment of tension in sheet 21. Sheet 21 may also be tensed by creating a speed differential between drum 25 and/or cutting drum 52, by increasing or decreasing the rotational speed of either drum. As stated above, calendar system 122, as shown in FIG. 10, may also operate as a tensioning system, as the sheet translates about rolls 122*a-d*.

Cutting assembly 40 generally forms strips 41 from sheet 21 for subsequent assembly of tire band 14. More specifically, cutting assembly 40 utilizes a plurality of cutting members 42 to cut strips 41, wherein each cutting member 42 includes a cutting edge 43. Cutting members 42 generally are spaced along a length of sheet 21, and along a circumference of cutting surface 50 and/or cutting drum 52. In the embodiment shown in the FIGURES, cutting members 42 are rotating knives. Rotating knives, in the embodiment shown, operate similarly to idler wheels, and freely rotate at the direction of the translating sheet 21. Still, rotating knives 42 may be driven by a motor or any other known driving means. Also, other means for cutting sheet 21 known to one of ordinary skill in the art may be used in lieu of rotating knives, including other non-rotating knives, blades, or edges.

Figure 6:
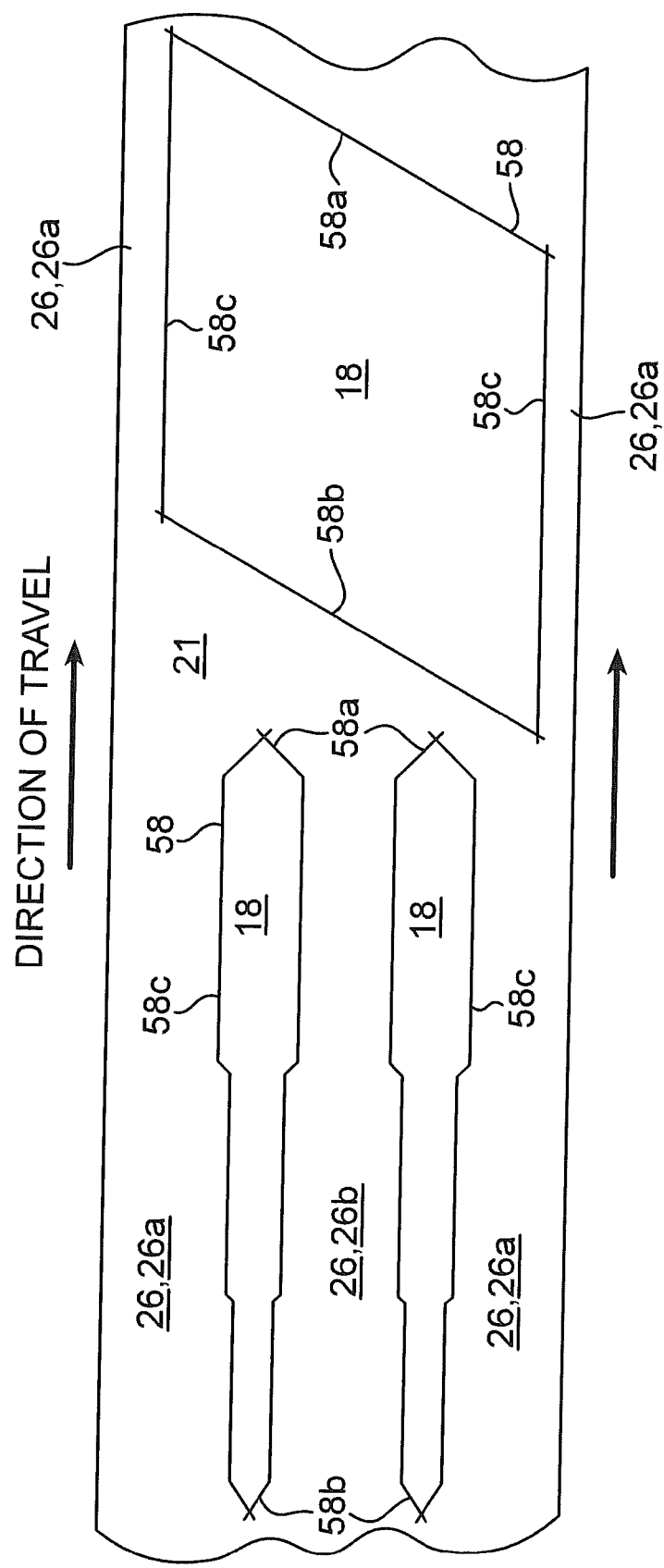
FIG. 6 is a top view of a sheet, showing cutting paths formed into a sheet from which strips have been formed and removed, according to an embodiment of the invention.
Figure 7:
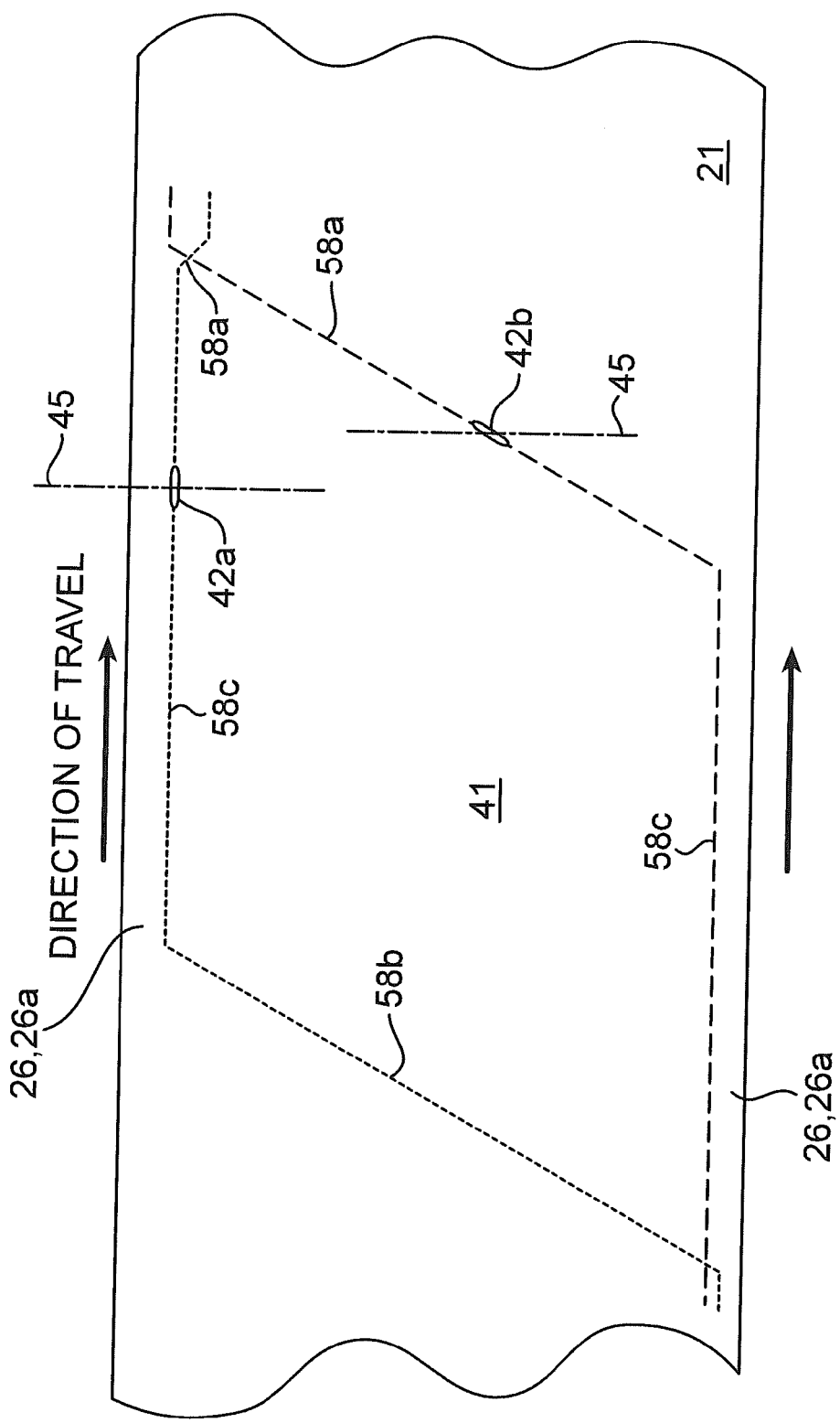
FIG. 7 is a top view of a sheet, showing the independent cut paths of each cutting member for cutting an exemplary strip from a sheet, according to an embodiment of the invention.

To cut strips 41 at desired locations along sheet 21, cutting members 42 translate laterally along a width of sheet 21 (i.e., in a sideways direction of sheet 21). Translation is achieved by translation members 44, each of which may comprise, without limitation, a linear actuator, a servo motor, a pneumatic or hydraulic cylinder, or any other translation means known to one of ordinary skill in the art. Translation members 44 generally translate along a linear translation axis 45, but it is also understood that non-linear translation may occur. In the embodiment shown in FIGS. 1, 3-8, a cutting member 42 may translate by way of translation member 44*a*, which is mounted to a side of sheet 21. Also shown, cutting member translation may be achieve by translation member 44b, which translates about a rail 46 or the like that is mounted above sheet 21. Each cutting member 42 may also be capable of extending up and down from rail 46 by an extension member 47, which may comprise any means of extending, such as, for example, a servo, solenoid, cylinder, which may be pneumatic or hydraulic. Each cutting member 42 may also be capable of rotating in angled relation to the direction in which sheet 21 is translating, as shown in FIG. 7. Such rotation may improve the ability of cutting member 42 to perform a transverse cut along a width of sheet, such as shown in FIG. 7. Cutting member 42 may rotate at any angle in any direction. In one embodiment, cutting member 42 rotates approximately 45 degrees from the translation direction (i.e., the direction of travel) of sheet 21. Rotation may be achieved by a rotation member 48, which may comprise an electromagnetic solenoid, or any other means of rotating a cutting member 42 that is known to one of ordinary skill in the art. Controller 90 generally controls the operation and movement of cutting members 42 by operation of translation members 44, extension members 47, and rotation members 48. Controller 90 may cooperate with a single or multi-axis motion controller to synchronize and coordinate the operation and movement of the cutting members 42.

Cutting members 42 may operate along a cutting surface 50, upon which sheet 21 may rest during the cutting process. In the embodiment of FIG. 1, cutting surface is arcuate, such as when associated with a cutting drum 52. Cutting surface may also comprise a flat or planar cutting surface may be used. Cutting surface 50 may smooth or rough, such as is described in relation to applicator drum 62 to promote adhesion between cutting surface 50 and sheet 21, as well as with any resulting strip 41 formed there from.

When using cutting drum 52, it is desirous to promote adhesion between cutting surface 50 and sheet 21. In addition to providing a particular cutting surface 50, as described above, another means to promote adhesion is to heat or cool the cutting surface 50 or drum 52. This adhesion promotes the separation of strips 41 from sheet 21 by allowing any strip 41 to remain adhered to cutting drum 52 and/or applicator drum 62 while the sheet 21 is lifted there from. Otherwise, any strip 41 may continue with the sheet 21 into recovery assembly 70. Of course, the adhesion is temporary as each strip 41 is ultimately removed and transferred to a building surface. Such adhesion may also maintain sheet 21, as well as any resulting strips 41, in a desired position along surface 50, which may more accurately cut and transfer strips from the cutting assembly 40 and/or applicator assembly 60. Adhesion may also be promoted by maintaining contact with cutting surface 50 for a particular duration or distance. In one embodiment, sheet 21 contacts surface 50 for at least 50% of the surface length, that is, 180 degrees of the drum circumference. Still, desired adhesion may be achieved even though sheet 21 does not engage cutting surface 50 for at least 50% of its surface length. To achieve a desired contact length, roller 54 may be used to direct sheet 21 onto cutting surface 50 at a desired location. Of course, the amount of contact desired for a sheet 21 may depend on the material used to form sheet 21, as well as the amount of heat present in cutting surface 50 or drum 52. Roller 54 may also apply a pressure upon sheet 21 as it is being applied to cutting surface 50 to facilitate adhesion between sheet 21 and cutting surface 50. This pressure may be achieved by utilizing a pressure member, such as, for example, a pneumatic or hydraulic cylinder or spring, to direct a force through roller 54, and upon sheet 21 and cutting surface 50. Other means of applying pressure upon sheet 21 known to one of ordinary skill in the art may be used, such as, for example, maintaining a gap between roller 54 and surface 50, where the gap is less than a thickness of sheet 21. In one embodiment, roller 54, or at least an outer surface thereof, may be formed of a compliant or flexible material, such as silicone or a gel-like material, for the purpose of providing a desired, and more uniform, pressure along a width of sheet 21.

Translation of sheet 21 through cutting assembly 40 may be controlled. As mentioned above, generator 20 is capable of operating at various speeds, which may be adjusted as desired. Further, with reference to FIG. 3, a motor 56 may be provided to drive cutting drum 54, and therefore, drive sheet 21 through cutting assembly 40 and/or to recovery assembly 70. Motor 56 may also direct strips 41 onto building drum 82, when cutting drum 52 is also operating as an applicator drum 62 of strip applicator assembly 60. The rotational speed of motor 56 may be adjusted to control the size (i.e., the thickness and/or width) of sheet 21. In one embodiment, the rotational speed of motor 56 is synchronized with the speed of generator 20, so not to stretch or compress any sheet 21 departing generator 20, and/or operating within cutting assembly 40, applicator assembly 60, and/or recovery assembly 70. Motor 56 may be controlled by controller 90, so to coordinate the operation of cutting members 42 to cut strips 41 from a sheet 21 translating along cutting surface 50.

Figure 8:
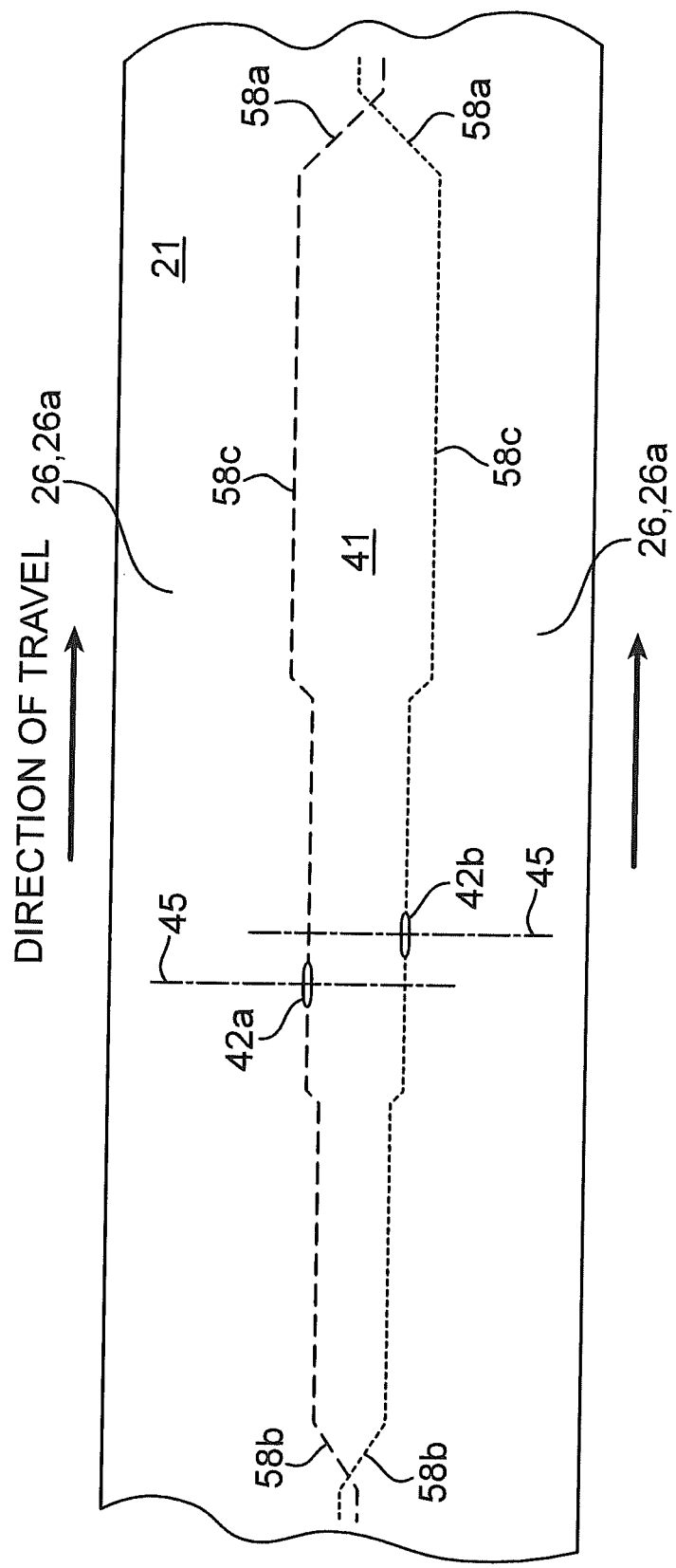
FIG. 8 is a top view of a sheet, showing the independent cut paths of each cutting member for cutting an exemplary strip from a sheet, according to an embodiment of the invention.

In operation, cutting members 42 cut a path 58 along translating sheet 21 to form one or more strips 41. In one embodiment, a pair of cutting members 42 cuts a closed-loop path 58 to form a strip 41, as shown generally in FIGS. 4-6, and more specifically in FIGS. 7-8. Path 58 circumscribes strip 41, and may comprise a leading edge 58a, a trailing edge 58b, and one or more side edges 58c. Leading edge 58a and trailing edge 58b, each of which form a beginning and end of strip 41, respectively, may also operate as a side edge 58c, such as when cutting a strip 41 comprising a tear-shape or a 4-sided diamond-shape. In one embodiment, a pair of cutting members 42a, 42b is able to form a strip 41 within sheet 21 while sheet 21 is operating in a closed-loop path, where such pair is by being placed in a staggered arrangement along a length of the sheet 21. This staggered arrangement allows a downstream, or subsequent, cutting member 42b to cut a path that intersects a preceding path formed by the upstream, or preceding, cutting member 42a, as shown in FIGS. 6-8. This intersection may be used to form a beginning and end of each strip 41, which refer to the leading and trailing edges 58a, 58b, respectively. Leading and/or trailing edges (i.e., the beginning and ending of strip 41, respectively) may be cut by an additional cutting member 42 that is dedicated to making either or both such cuts. Cutting members 42 may translate while cutting sides 58c, such as, for example, to adjust or taper (i.e., increase or decrease) the width of strip 41, or to otherwise vary the shape and/or size of strip 41. One or more cutting members 42 may also cut slits 16 (discussed above with reference to FIG. 2) during or after the formation of strips 41.

In the embodiments shown in FIGS. 7-8, cutting members 42a, 42b intersect to initialize cutting path 58 and leading edge 58a. Such intersection may be achieved by crossing the cutting paths of each cutting member 42a, 42b, although crossing paths is not necessary to achieve the intersection, as the path of either member 42a, 42b may simply extend from a cutting path generated by the other member 42a, 42b. In the FIGURES, each cutting member 42a, 42b extends in a lateral direction (i.e., in a direction angled from the translation direction of sheet 21 or a direction along a width of sheet 21) to make a lateral cut. In making a lateral cut, each cutting member 42a, 42b may orient its cutting edge 43 in a direction parallel to the translation direction of sheet 21 or may rotate its cutting edge 43 to be angled relative to the translation direction or the centerline of sheet 21, as represented by cutting member 42b in FIG. 7. After reaching a desired lateral position, each cutting member 42a, 42b makes side cuts 58c, and eventually forms trailing edge 58b with a final intersection to complete the formation of strip 41. As shown in FIG. 8, strips 41 may taper in width, in stepped fashion as shown, or in a gradual manner, which may be linear or arcuate. Other variations or means of forming strips 41 may exist.

Figure 4:
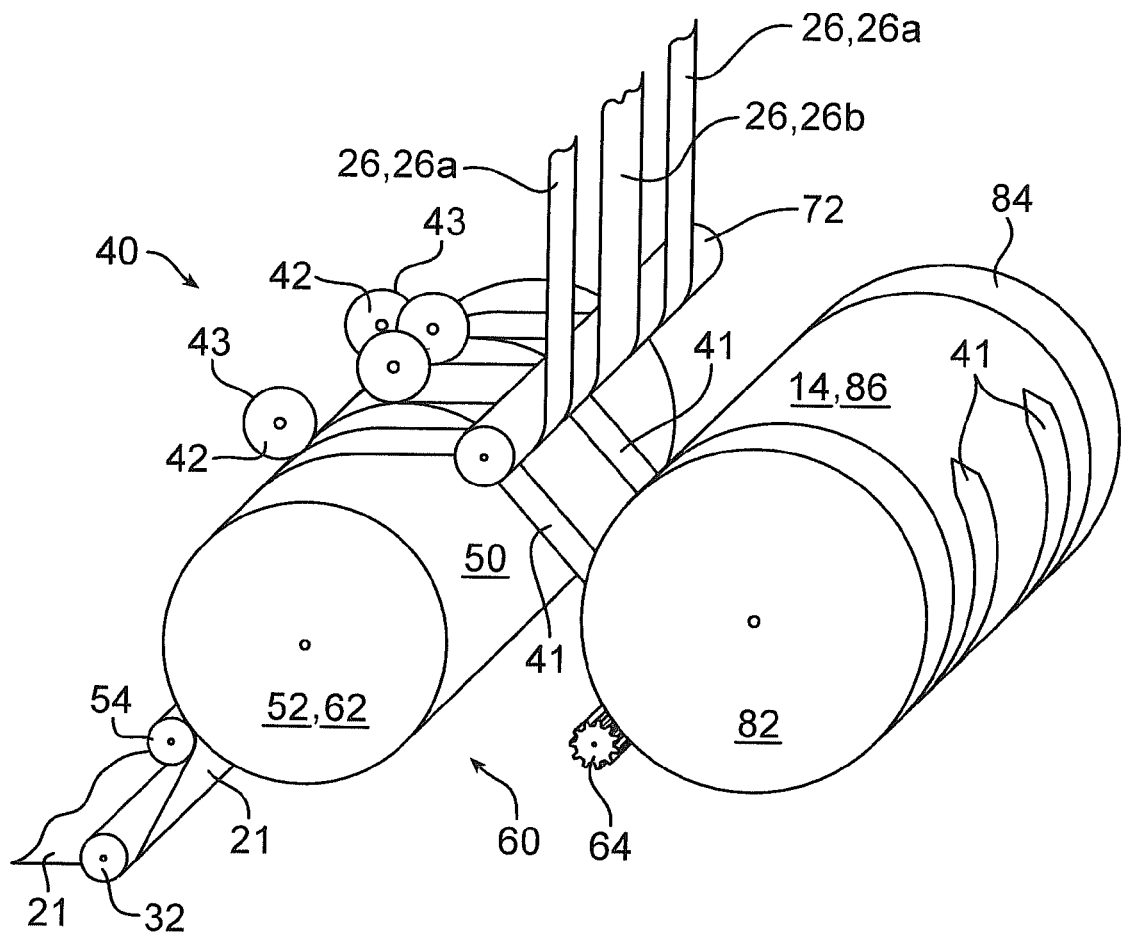
FIG. 4 is a perspective view of the cutting and application assemblies of the system shown in FIG. 1, according to an embodiment of the invention.
Figure 5:
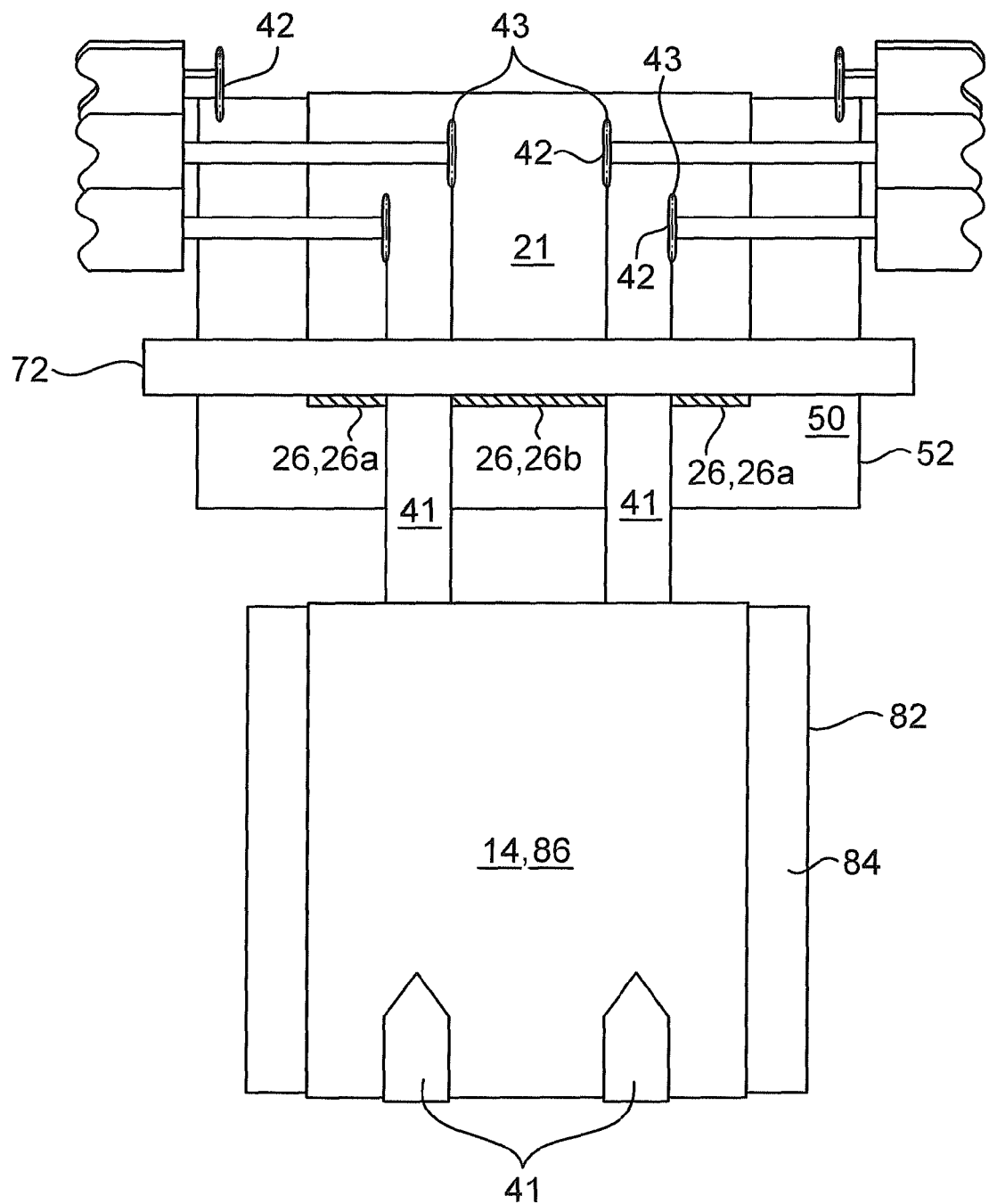
FIG. 5 is a top view of the cutting and application assemblies of the system shown in FIG. 1, wherein said assemblies are shown forming strips from a sheet and applying the strips onto a building surface to form a band, according to an embodiment of the invention.

Subsequent to the formation of one or more strips 41, the remaining portion of sheet 21 is directed to recovery assembly 70 for reuse by generator 20. To maintain a continuous sheet 21 that automatically navigates through system 10, a continuous portion of sheet 21 remains after removal of one or more strips 41 there from. With reference to FIGS. 4-8, each portion of sheet 21 that remains continuous (i.e., attached to preceding and subsequent portions of sheet 21) with sheet 21 is referred to as segment 26. Each segment 26 extends between longitudinally-extending voids 18, the voids 18 corresponding to strips 41 cut from sheet 21. One or more strips 41 may be formed within the width of sheet 21, such that a pair of segments 26a extend along the lateral sides of sheet 21, as shown in FIGS. 4-8. It is also contemplated that a segment 26b may be located intermediately (i.e., between sheet sides) along sheet 21, such as, for example, when two or more strips 41 are concurrently cut from sheet 21, as shown in FIGS. 4-6. Finally, an intermediate segment 26b may exist with or without any side segment 26a.

If the cross-section of any such return segment 26 becomes too small, or, in other words, becomes too thin or too narrow, segment 26 may tear while translating about system 10, or while one or more strips 41 are separating from sheet 21. Any tear or discontinuity in a segment 26 may compromise the continuity of sheet 21. Therefore, any such segment 26 should be properly sized to withstand the strip-separating stresses, as well as other stresses associated with navigating through system 10. Of course, the size of a segment 26 may vary according to the material forming sheet 21 (as each sheet material may have different tear properties). In one embodiment, when sheet 21 is between 0.5-1.5 mm thick, the combined width of all segments 26 for any cross-section of sheet 21 (i.e., along a transverse plane perpendicular to the translation direction (i.e., the direction of travel) of sheet 21) is at least 20 mm. In another embodiment, also when sheet 21 is between 0.5-1.5 mm thick, the width of each such segment 26 is at least 10 mm wide. In yet another embodiment, for sheets 21 between 0.5-1.5 mm thick, each side of sheet 21 remains uncut so to provide a segment 26a at each lateral side of a cut sheet 21, as shown in the FIGURES, where each such segment 26a is at least 20 mm wide, and any intermediate segment 26b (i.e., any segment 26 not located along a side of sheet 21) may comprise any width, such as, for example, not less than 5 mm wide. Because the composition of the sheet material may vary, as well as the sheet thickness and the stresses experienced during translation, segments 26 may comprise widths greater or less than those disclosed above. Side segments 26a, or a portion thereof, may also comprise a thickness that is greater than the remaining portions of sheet 21, for the purpose of resisting tearing during the operation of system 10. In one embodiment, the thickened portions are formed by generator 20. Thickened portions may also exist in other locations along the width of sheet 21 as desired.

With general reference to FIGS. 1, 4-5, system 10 also includes an applicator assembly 60 for applying one or more continuous strips 41 to a building surface to form a band 14. The one or more strips 41 are wound about the building surface to form the multi-layered band 14. Applicator assembly 60 includes an applicator drum 62 that transfers one or more strips 41 there from to building assembly 80. To provide adhesion between applicator drum 62 and strips 41, which promotes the separation of strips 41 from sheet 21, applicator drum 62 may be heated or cooled. In particular embodiments, applicator drum 62 is maintained at a temperature at least 10 degrees Celsius higher than the temperature of sheet 21 and/or any strips 41. In other embodiments, applicator drum 62 is maintained at approximately 70 degrees Celsius. The surface of applicator drum 62 may comprise a smooth surface, which may be a chromed or hot chromed surface, so to provide a smooth, capillary-like surface that may promote molecular bonding and/or may operate like a vacuum to facilitate retention of strips 41 thereon. Improved adhesion may also be provided by providing a rough surface, the rough surface providing increased surface area for improved contact area, and therefore, increased adhesion. Applicator drum 62 may also operate as the cutting drum 52. Further, the temperature controls and conditions, as well as the surface conditions and treatments discussed with regard to applicator drum 62 above may also be applied to cutting drum 52 to improve adhesion between drum 52 and sheet 21.

As shown in FIG. 9, applicator drum 62 translates toward a building surface for the purpose of transferring a strip 41 to the building surface. Once an initial portion of strip 41 is transferred to the building surface, the strip is wound about the building surface to form a band 14. Building surface, for example, may initially comprise a contact surface 84 of a building drum 82 or a tire carcass 84 located on the building drum 82. Building drum 82 may comprise any drum, and may or may not be a drum used to build tire carcasses. Once a strip 41 has been applied to the building surface, the building surface for subsequent strips 41 may include at least a portion of the previously-applied strip 41, which may also be referred to as a band 14.

As mentioned above, applicator drum 62 translates towards a building surface to transfer a strip 41 thereto. More generally, a relative translation between applicator drum 62 and the building surface exists, as either or both may translate towards the other for the purpose of transferring a strip 41 to the building surface. To transfer a strip 41 from applicator drum 62 to a building surface, the applicator drum 62 is located in a transfer position relative to the building surface, such that a strip 41 passing between applicator drum 62 and the building surface contacts the building surface. The contact may be enough to develop enough adhesion between the strip 41 and the building surface, or a pressure may be applied to the strip 41 as it passes between drum 62 and the building surface. This pressure may be achieved by locating drum 62 closer to building surface, so that strip 41 squeezes between drum 62 and the building surface. Additionally, a pressure roller 64 may be used to apply pressure to the strip 41 as it is being wound about the building surface. This pressure not only promotes adhesion for building and maintaining a band 14, but also may promote cohesion in the cured product and reduce any air trapped within band 14. Pressure roller 64 generally includes a variable or "bumpy" surface, which may comprise, for example, a toothed surface as shown in the FIGURES.

Figure 9A:
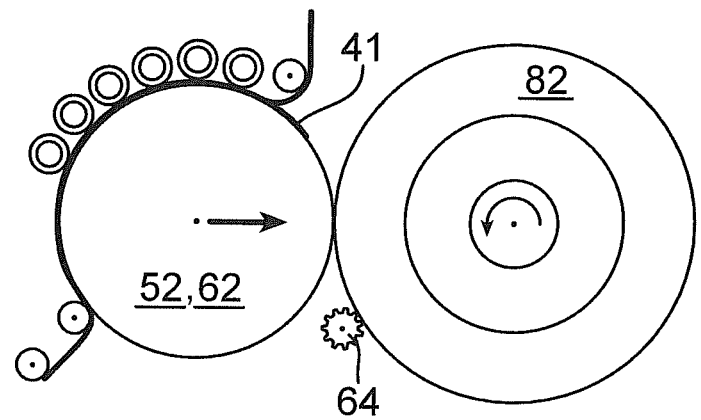
FIG. 9a is a side view of the forming system shown in FIG. 1, showing the cutting/applicator drum in a strip transfer position after translating towards the building drum, according to an embodiment of the invention.
Figure 9B:
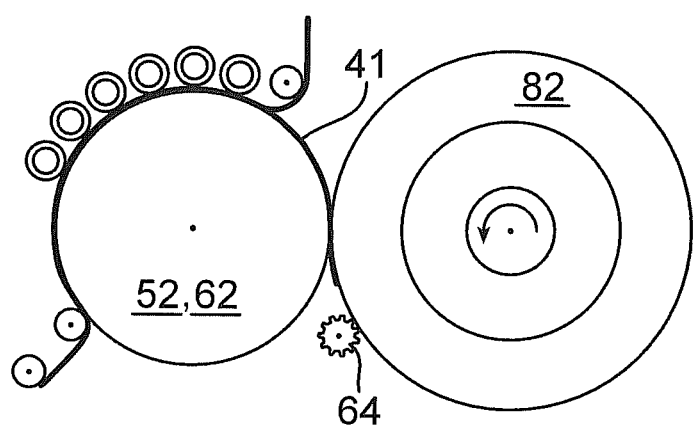
FIG. 9b is a side view of the forming system shown in FIG. 9a, showing a strip attached to the building drum after initially translating between the cutting/applicator drum and the building drum, according to an embodiment of the invention.
Figure 9C:
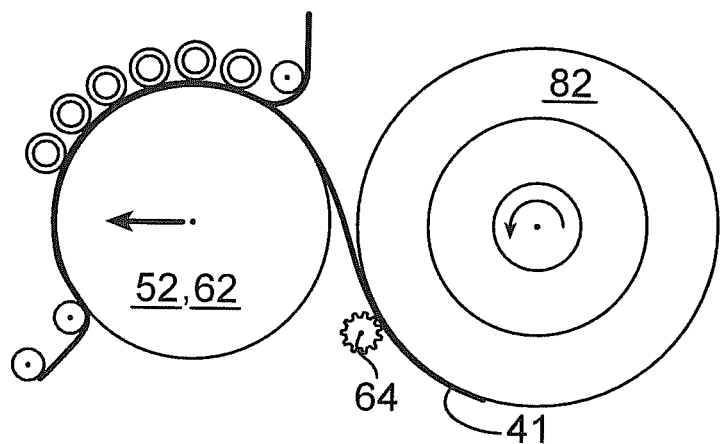
FIG. 9c is a side view of the forming system shown in FIG. 9b, showing the cutting/applicator drum retracting from a strip transfer position to a resting position, according to an embodiment of the invention.
Figure 9D:
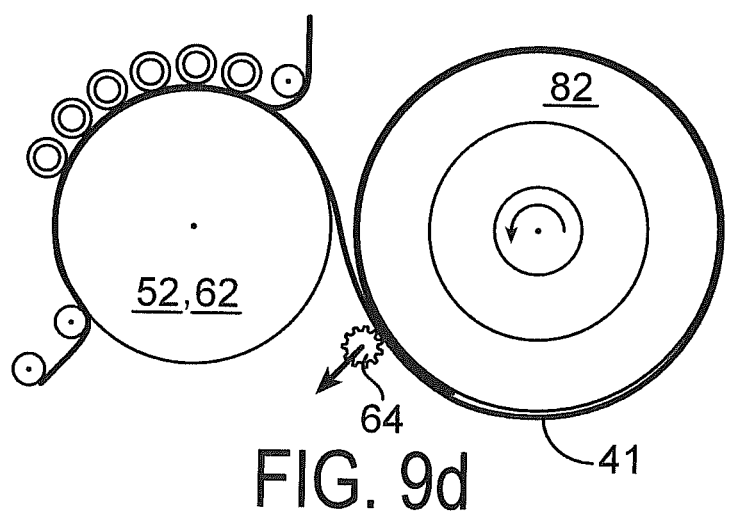
FIG. 9d is a side view of the forming system shown in FIG. 9c, showing the pressure roller retracting with the growth of the multi-layered band, according to an embodiment of the invention.

In operation, according to one embodiment, applicator drum 62 translates from an initial (i.e., a home) position to a transfer position, as shown in FIG. 9a. Drum 62 may then remain in the transfer position for a temporary period, that is, until the strip 41 passes between drum 62 and the building surface, as shown in FIG. 9b. Subsequent to this temporary period, drum 62 may retract to a resting position as shown in FIG. 9c, which may or may not be the home position. It is understood that drum 62 may remain in the transfer position, which includes gradually retracting as the band 14 grows in diameter. During the transfer and winding process, the rotational velocity of the building surface (the outer surface of band 14) increases as the outer diameter of band 14 increases. Because it may be desired to maintain the size, shape, and structural integrity of strips 41 during transfer and winding operations, a constant rotational velocity between the building surface and the applicator drum 62 may be provided so that strip 41 may translate at a relatively constant velocity. To achieve the constant velocities, the rotational velocity of the surface of applicator drum 62 and that of the building surface may be substantially the same. Further, during the winding process, the rotational speed of building drum 82 may be decreased and/or the speed of applicator drum 62 may be increased to compensate for the increasing diameter of band 14. Also, during the winding process, pressure roller 64 generally remains in pressurized contact with any strip 41 being applied to the building surface, and gradually retracts as the diameter of band 14 increases as generally shown in FIG. 9d, so not to damage any strip 41 or band 14 during the winding process. Once band 14 is complete, applicator drum 62 may translate and return to a desired position, which may be the home position, to provide adequate clearance for removal of band 14 (with or without a tire carcass 86, if existing) from building drum 82.

Recovery assembly 70 generally receives sheet 21 that has translated through cutting assembly 40, for the purpose of directing the recovered sheet 21 back to generator 20 as input material, and thereby completing a closed-loop path within system 10. The recovered sheet 21 may or may not have been cut by cutting assembly 40, that is, one or more strips 41 may not have been removed there from, such as when system 10 is in an idle mode. In the embodiment of FIG. 1, recovery assembly 70 includes a transfer roller 72 and a transfer assembly 74. In one embodiment, transfer roller 72 initially engages sheet 21 upon release from cutting assembly 40, and directs the recovered sheet 21 onto transfer assembly 74. In one embodiment, transfer assembly 74 generally comprises a plurality of rollers 76 and a conveyor belt 78. In lieu of the roller and conveyor belt, other means of translating sheet 21 known to one of ordinary skill in the art may be used, which may include, for example, a series of rollers or drums.

As shown in FIG. 1, recovery assembly 70 may also include a material processing unit 79. Processing unit 79 generally controls the manner in which recovered sheets 21 are re-introduced into generator 20 as input material. Generator 20 may have difficulties processing sheet 21 in the form it is recovered. For example, extruders may have difficulty processing cold or thin input material. Further, the width of generator input 22 may have certain width requirements for input material that would encourage manipulation of recovered sheet 21 to particular widths. For example, when using calendars, it may be desirous to input material substantially along a width of the calendar, as localized input may not generate sheets 21 having a desired width. Also, generator input 22 may be smaller than the width of recovered sheet 21. Issues may also arise in response to the amount of sheet 21 being recovered. For example, a plurality of strips 41, or a relatively wide strip 41, may have been removed from sheet 21 prior to recovery, which may leave a minimal remainder of sheet 21 for recovery. Therefore, processing unit 79 may heat, cool, compile, resize, reshape, and/or distribute desired amounts of sheet 21 as input material for generator 20. Processing unit 79 may also control the rate at which recovered sheet 21 is introduced as input material.

In the embodiment shown in FIG. 1, processing unit 79 includes a pivotable conveyor, which is capable of pivoting back and forth to build-up sheet 21 as it is deposited for input into generator 20. In other embodiments, processing unit 79 may comprise an extruder, a plurality of cutting members, rollers, drums, or any other means for heating, cooling, resizing, reshaping, and/or distributing recovered sheet 21 as input material for generator 20. Processing unit 79 may be in communication with controller 90, which may provide instructions for manipulating sheet 21 and/or supplying sheet 21 as input material 12b for generator 20. Controller 90 may obtain information about retrieved sheets 21, such as weight, shape, and width measurements. Scales, lasers, or other measuring means may also be included along transfer assembly 74 and/or processing unit 79 to obtain any desired information regarding recovered sheet 21.

As mentioned earlier, it may be desired to form a band 14 formed of multiple materials, such as is shown in FIG. 2. For example, when band 14 is a tread band, it may be desired to include a hidden or submerged tread layer to provide desired properties when the submerged material becomes exposed after at least a portion of the first material is worn. To achieve this multi-material band 14, a tread may be built at a single station having a plurality of systems 10, or may be built at multiple stations. When being built in a single station, two or more systems 10 may be used, wherein, for example, one system 10 is located above another system 10.

Figure 11:
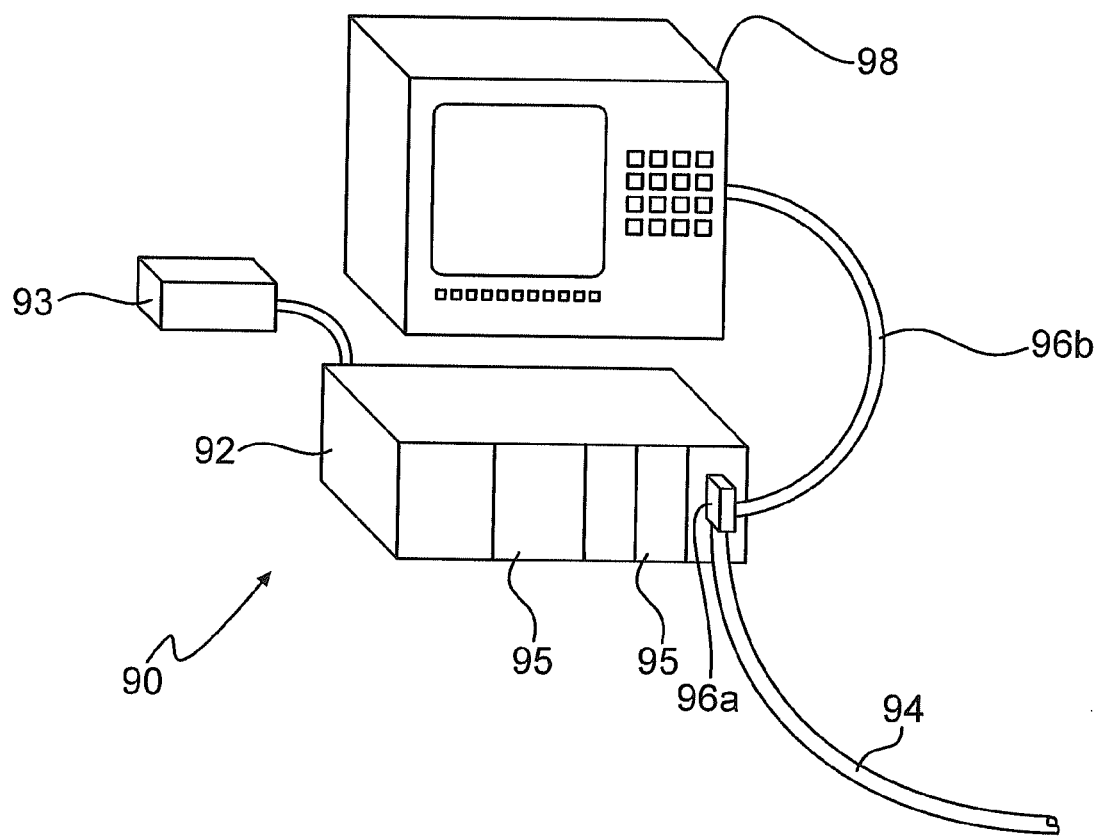
FIG. 11 is a perspective view of a programmable logic controller for use with the multi-layered tire component-generating system, according to an embodiment of the invention.

With reference to FIG. 11, system 10 may include a programmable logic controller 90, or other device having a processor that can execute programmed instructions, such as, for example, a personal computer or main frame computer. System 10 may also include a user interface 98. Controller 90 generally receives input and/or instructions to control system 10 and the operation of each assembly thereof, which includes the generation and translation of sheet 21 through system 10, the cutting and application of strips 41, and the recovery and manipulation of recovered sheet 21 for regeneration. Controller 90 may include a logic processor 92 (which may be a microprocessor), a memory storage device 93, such as RAM (random access memory), ROM (read-only memory), PROM (programmable read-only memory), and at least one input/output (I/O) cable 94 for communicating with system 10. Further, controller 90 may include an I/O slot 95 for housing an I/O card having I/O cable connector 96. An operator may utilize a user-interface 98 to provide input to, and/or to control or instruct the operation of, controller 90 and system 10, which includes performing each step and method associated with forming and translating a sheet 21, cutting strips 41 there from, and applying the strips 41 to a building surface for assembling a multi-layered band 14. User-interface 98 and controller 90 may communicate by way of I/O cable 96. It is also contemplated that wireless communications may exist between controller 90, user-interface 98, and system 10. Generally, controller 90 may be programmed by any known graphical or text language. Programmed instructions, data, input, and output may be stored in a memory storage device 93, which is accessible to processor 92. Memory device 93 may comprise any commercially known storage device, such as such as hard disk drives, optical storage devices, flash memory, and the like. Processor 92 executes programmed instructions and may perform the instructions and any calculations and/or measurements useful for controlling system 10 and performing the methods and operations discussed herein. Memory storage device 93 also stores inputs, outputs, and other information, such as, the geometry and location of any drum 52, 62, 82 and cutting members 42, the desired speed of sheet 21 translation and formation. As stated earlier, controller 90 may be in communication with an axis motion controller to coordinate the operation of cutting members 42 by way of translation members 44, extension members 47, and/or rotation members 48. Further, controller 90 may be in communication with each of the cutting drum 52, applicator drum 62, and/or building drum 82, and is therefore able to determine the rotational position of each such drum during rotation thereof.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method of forming a multi-layered tire component, the method comprising the steps of:
providing a mechanical system, the system including a plurality of cutting members and a sheet generator;
introducing input material into the sheet generator;
forming a sheet of material with the sheet generator;
translating the sheet of material along a translation path through the mechanical system, wherein the translation path is a closed-loop path extending from the sheet generator and returning at least a portion of the sheet to the sheet generator for use as input material;
cutting a strip from the sheet with a pair of the plurality of cutting members along an applicator drum, this step occurring during the step of translating;
mechanically applying the strip to a building surface associated with a building drum, this step occurring during the step of translating and after the step of cutting the strip has initiated;
wherein the step of mechanically applying the strip includes placing the strip into pressurized contact against the building surface by translating at least one of the building surface and the applicator drum toward the other to force the strip against the building surface;
retracting at least one of the building surface and the applicator drum away from the other to a resting position after placing the strip into pressurized contact against the building surface such that the building surface is spaced from the applicator drum by a distance greater than a desired thickness of the multi-layer tire component being formed at the resting position, which terminates placement of the strip into pressurized contact against the building surface; and
continuing the step of mechanically applying the strip from the applicator drum to the building surface after retracting the at least one of the building surface and the applicator drum away from the other to the resting position;
wherein the pair of cutting members is employed to form the strip along a portion of the sheet supported by the applicator drum, each cutting member of the pair of cutting members comprising a rotatable knife, wherein the cutting of the strip from the sheet comprises:
cutting one or more laterally extending cutting paths into the sheet of material using at least one cutting member of the pair of cutting members to form a leading edge of the strip;
cutting side cutting paths extending from the leading edge using the pair of cutting members to form a width of the strip;
cutting one or more laterally extending cutting paths from the side cutting paths using at least one cutting member of the pair of cutting members to form a trailing edge of the strip, wherein the cutting paths form the perimeter of the strip.

2. The method of claim 1, wherein placing the strip into pressurized contact against the building surface includes translating the applicator drum towards the building surface for the step of mechanically applying the strip.

3. A method of forming a multi-layered tire component, the method comprising the steps of:
providing a mechanical system, the system including a plurality of cutting members and a sheet generator;
introducing input material into the sheet generator;
forming a sheet of material with the sheet generator;
translating the sheet of material along a translation path through the mechanical system, wherein the translation path is a closed-loop path extending from the sheet generator and returning at least a portion of the sheet to the sheet generator for use as input material;
cutting a strip from the sheet with the plurality of cutting members along a portion of the sheet supported by an applicator drum, the plurality of cutting members comprising a pair of cutting members, and this step occurring during the step of translating, the step of cutting including:
positioning the pair of cutting members relative to the sheet, wherein each cutting member of the pair of cutting members is a knife independently movable in a direction perpendicular to a direction of sheet translation and arranged in a spaced relation to the other along a length of the sheet;
engaging one of the cutting members of the pair of cutting members with the sheet to form a first cutting path;
engaging the other cutting member of the pair of cutting members with the sheet to form a second cutting path, wherein the first and second paths intersect in a first instance at a first end of the strip and intersect in a second instance at a second end of the strip, the first and second cutting paths extending between the first and second end of the strip in a spaced apart relationship, where one of the first and second strip ends forms a leading edge of the strip and the other of the first and second strip ends forms a trailing edge of the strip; and,
mechanically applying the strip to a building surface on a building drum, this step occurring during the step of translating and after the step of cutting the strip has initiated;
wherein the step of mechanically applying the strip includes placing the strip into pressurized contact against the building surface by translating at least one of the building surface and the applicator drum toward the other to force the strip against the building surface;
retracting at least one of the building surface and the applicator drum away from the other to a resting position after placing the strip into pressurized contact against the building surface such that the building surface is spaced from the applicator drum by a distance greater than a desired thickness of the multi-layer tire component being formed at the resting position, which terminates placement of the strip into pressurized contact against the building surface; and
continuing the step of mechanically applying the strip from the applicator drum to the building surface after retracting the at least one of the building surface and the applicator drum away from the other to the resting position.

4. The method of claim 1, wherein each of the pair of the plurality of cutting members form a rotary knife configured to pivot relative to a translation direction of the sheet, whereby the orientation of a cutting direction of each of the pair cutting members is configured to pivot and become biased to both the translation direction of the sheet and a direction perpendicular to the translation direction of the sheet to thereby selectively form a cutting path having a length extending in any direction between the translation direction of the sheet and the direction perpendicular to the translation direction of the sheet.

5. The method of claim 1, wherein the sheet is an elastomeric material.

6. The method of claim 1, further comprising:
cutting a second strip from the sheet, wherein the second strip is cut subsequent to the strip.

7. The method of claim 1 further including the steps of:
terminating the cutting of the strip from the sheet after the tire component has been formed, wherein the sheet continues to translate about the closed-loop path in the step of translating such that at least a portion of the sheet comprises excess material used as input material for continuous formation of the sheet; and,
re-performing cutting in order to create a second strip from the sheet and mechanically applying the second strip to a building surface for forming a subsequent tire component.

8. The method of claim 3, wherein each of the cutting members of the pair of cutting members forms a rotary knife configured to pivot relative to a translation direction of the sheet, whereby the orientation of a cutting direction of each of the cutting members of the pair of cutting members is configured to pivot and become biased to both the translation direction of the sheet and a direction perpendicular to the translation direction of the sheet to thereby selectively form a cutting path having a length extending in any direction between the translation direction of the sheet and the direction perpendicular to the translation direction of the sheet.

9. The method of claim 1, wherein two or more strips are concurrently cut from the sheet with the plurality of cutting members.

* * * * *